United States Patent
Kintis et al.

(10) Patent No.: US 7,068,745 B2
(45) Date of Patent: Jun. 27, 2006

(54) FEEDFORWARD AMPLITUDE CANCELLATION TOPOLOGY FOR MULTI-CARRIER APPLICATIONS

(75) Inventors: Mark Kintis, Manhattan Beach, CA (US); Robert R. Harnden, Redondo Beach, CA (US); Kenneth B. Weber, Redondo Beach, CA (US); Mark V. Keller, Palos Verdes Estates, CA (US); Donald L. Lochhead, San Diego, CA (US); Donald R. Martin, Redondo Beach, CA (US)

(73) Assignee: Northrop Gruman Corporation, Los Angeles, CA (US)

( * ) Notice: Subject to any disclaimer, the term of this patent is extended or adjusted under 35 U.S.C. 154(b) by 857 days.

(21) Appl. No.: 09/991,500

(22) Filed: Nov. 16, 2001

(65) Prior Publication Data

US 2003/0095615 A1    May 22, 2003

(51) Int. Cl.
    *H04L 25/10*    (2006.01)
(52) U.S. Cl. ...................... 375/350; 375/316
(58) Field of Classification Search ............. 375/316, 375/350, 346
    See application file for complete search history.

(56) References Cited

U.S. PATENT DOCUMENTS

| | | | | |
|---|---|---|---|---|
| 5,303,093 A | * | 4/1994 | Kawasaki | 360/30 |
| 5,553,040 A | * | 9/1996 | Hanano et al. | 369/44.34 |
| 5,570,350 A | * | 10/1996 | Myer et al. | 370/335 |
| 5,724,653 A | * | 3/1998 | Baker et al. | 455/296 |
| 6,009,126 A | * | 12/1999 | Van Bezooijen | 375/319 |
| 6,700,514 B1 | * | 3/2004 | Soltanian et al. | 341/118 |
| 2002/0048326 A1 | * | 4/2002 | Sahlman | 375/297 |
| 2003/0063686 A1 | * | 4/2003 | Giardina et al. | 375/296 |
| 2003/0090319 A1 | * | 5/2003 | Ohkawa | 330/52 |
| 2003/0199257 A1 | * | 10/2003 | Wilkinson et al. | 455/127.1 |

OTHER PUBLICATIONS

Yang et al., 2000, Digital Controlled Adaptive Feedforward Amplifier for IMT-2000 Band.*

* cited by examiner

*Primary Examiner*—Kevin Burd
*Assistant Examiner*—Juan Alberto Torres
(74) *Attorney, Agent, or Firm*—Carmen B. Patti & Assoc., LLC

(57) ABSTRACT

A multi-carrier receiver system and method for receiving a transmission frequency multi-carrier signal include a feedforward cancellation loop. A frequency conversion circuit generates an intermediate frequency (IF) multi-carrier signal based on the transmission frequency multi-carrier signal. The feedforward cancellation loop generates an amplitude corrected multi-carrier signal based on the IF multi-carrier signal such that the amplitude corrected multi-carrier signal has a reduced dynamic range with respect to the IF multi-carrier signal. A primary A/D converter having a significantly lower dynamic range requirements can therefore generate a digital multi-carrier signal based on the amplitude corrected multi-carrier signal. The feedforward cancellation loop therefore enables the primary A/D converter to process multi-carrier signals without the need for large dynamic range requirements.

25 Claims, 3 Drawing Sheets

FEEDFORWARD AMPLITUDE CANCELLATION TOPOLOGY FOR MULTI-CARRIER APPLICATIONS

TECHNICAL FIELD

The present invention relates generally to digital receiver systems. More particularly, the invention relates to a multi-carrier receiver system having a feedforward cancellation loop.

BACKGROUND

It is well known that communication systems are a critical part of both commercial and military applications. In fact, as semiconductor technologies advance, the demand for digital communication systems continues to grow. Digital communication systems can be conceptually divided into systems that transmit and systems that receive. A particularly important digital receiver system is the cellular basestation receiver.

Many communication standards (such as EDGE/GSM used in the United States and Europe) specify the generation of multi-carrier signals at transmission frequencies of 850 MHz, 900 MHz, 1800 MHz and 1900 MHz. These transmission frequency multi-carrier signals have a bandwidth of approximately 15 MHz or more and can include any number of single carrier signals. One conventional approach to receiving these signals involves dedicating a receiver system to each single carrier signal. Under this approach, each receiver system can be designed to better handle the anticipated power level of the corresponding single carrier signal, resulting in less stringent dynamic range requirements being placed on the corresponding analog to digital (A/D) converter. The overall systems costs, however, are extremely high because a receiver system is required for each carrier (or channel).

FIG. 1 illustrates another conventional approach to receiving multi-carrier signals. Under this approach, a multi-channel receiver system 10 attempts to process a multi-carrier signal 12. Due to the high transmission frequencies, however, a "down conversion" process is typically required before conversion of the signal into a digital format. Thus, the receiver system 10 mixes the transmission frequency multi-carrier signal 12 with a first local oscillator (LO) signal 14 to generate a preliminary intermediate frequency (IF) multi-carrier signal. A bandpass filter 16 filters the predetermined transmission bandwidth (typically 15 MHz) from the preliminary IF multi-carrier signal. A second down converter mixes a second LO signal 18 with the filtered preliminary IF multi-carrier signal to generate the final IF multi-carrier signal that is used by the analog to digital (A/D) converter 20 to generate a digital signal.

It is important to note that within the typical multi-carrier cellular spectrum there is a large difference in signal amplitudes from carrier to carrier. Thus, given modern day cellular communication protocols, the A/D converter would be required to have an approximately 90 dB dynamic range in order to process the IF multi-carrier signal. Commercially available A/D converters, on the other hand, have a dynamic range that is typically much lower than would be required under the approach shown in FIG. 1 (approximately 60 dB dynamic range). In fact, this dynamic range limitation is a primary reason why the current state of the art in cellular basestations is to have many separate single channel receivers.

It is also important to note that the second down conversion is required because the conventional A/D converter 20 is unable to process data at a rate as high as the preliminary intermediate frequency of 200 MHz. The additional RF circuitry required for the down conversion adds to the overall cost of the system. It is therefore desirable to provide a receiver system that does not require the RF circuitry associated with multiple frequency down conversions. It is also desirable to provide a receiver system that does not require a dedicated A/D converter for each signal carrier signal and does not require an A/D converter with a large dynamic range.

SUMMARY OF THE INVENTION

The above and other objectives are provided by a multi-carrier receiver system and method for receiving a transmission frequency multi-carrier signal. The receiver system has a frequency conversion circuit, a feedforward cancellation loop, and a primary analog to digital (A/D) converter. The frequency conversion circuit generates an intermediate frequency (IF) multi-carrier signal based on the transmission frequency multi-carrier signal. The feedforward cancellation loop generates an amplitude corrected multi-carrier signal based on the IF multi-carrier signal such that the amplitude corrected multi-carrier signal has a reduced dynamic range with respect to the IF multi-carrier signal. The primary A/D converter generates a digital multi-carrier signal based on the amplitude corrected multi-carrier signal. The feedforward cancellation loop enables the primary A/D converter to process multi-carrier signals without the need for a large dynamic range.

Further in accordance with the present invention, a feedforward cancellation loop is provided. The cancellation loop has a secondary A/D converter for generating a digital cancellation signal based on an IF multi-carrier signal. A level adjustment circuit is coupled to the secondary A/D converter for digitally adjusting the digital cancellation signal such that carriers in the digital cancellation signal correspond to carriers in the IF multi-carrier signal having power levels above a predetermined threshold. The cancellation loop further includes a digital to analog (D/A) converter for generating an analog cancellation signal based on the digital cancellation signal.

In another aspect of the invention, a method for receiving a transmission frequency multi-carrier signal is provided. The method includes the step of generating an IF multi-carrier signal based on the transmission frequency multi-carrier signal. An amplitude corrected multi-carrier signal is generated based on the IF multi-carrier signal such that the amplitude corrected multi-carrier signal has a reduced dynamic range with respect to the IF multi-carrier signal. The method further provides for generating a digital multi-carrier signal based on the amplitude corrected multi-carrier signal.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and sub-joined claims and by referencing the following drawings in which:

DETAILED DESCRIPTION OF THE PREFERRED EMBODIMENTS

Figure 1:
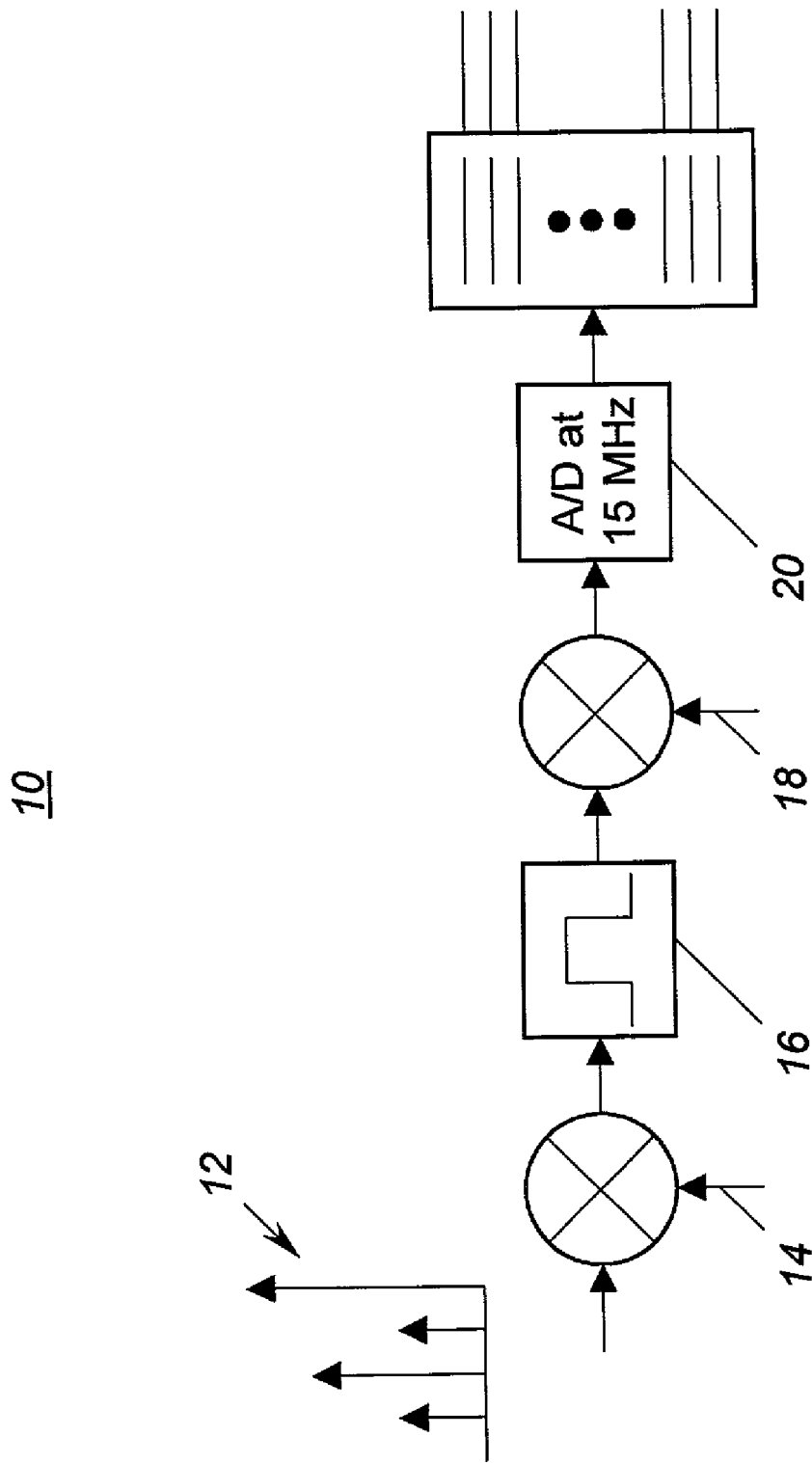
FIG. 1 shows a conventional receiver system.
Figure 2:
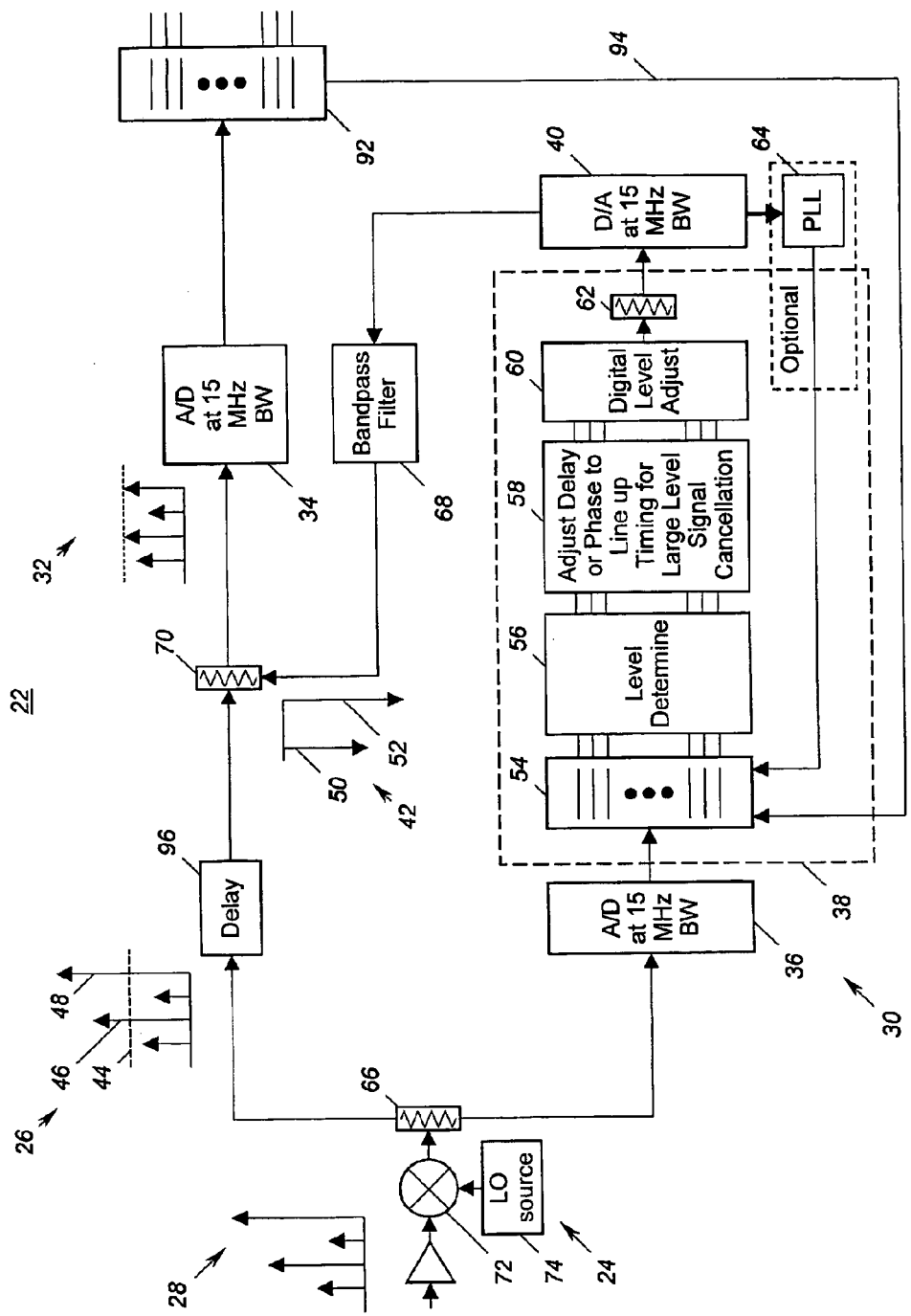
FIG. 2 shows a multi-carrier receiver system according to one embodiment of the present invention.

Turning now to FIG. 2, one approach to the present invention is shown in greater detail. Generally, the multi-carrier receiver system 22 has a frequency conversion circuit 24 for generating an intermediate frequency (IF) multi-carrier signal 26 based on a transmission frequency multi-carrier signal 28. A feedforward cancellation loop 30 generates an amplitude corrected multi-carrier signal 32 based on the IF multi-carrier signal 26 such that the amplitude corrected multi-carrier signal 32 has a reduced dynamic range with respect to the IF multi-carrier signal 26. A primary A/D converter 34 generates a digital multi-carrier signal based on the amplitude corrected multi-carrier signal 32. The feedforward cancellation loop 30 enables the primary A/D converter 34 to be designed to operate at a much lower dynamic range (e.g., 60 dB or 10 bits).

While the following description will primarily focus on cellular basestation applications, it is important to note that the present invention is not so limited. For example, any application in which an RF signal containing multiple carriers is received can benefit from the present invention. Notwithstanding, the multi-carrier receiver system 22 provides a number of benefits for which cellular communications are uniquely suited. For example, in densely populated urban areas, the conventional approach of dedicated receiver systems becomes cost prohibitive. Furthermore, with the growing popularity of mobile communications it is anticipated that multi-carrier processing will be critical in the very near future. The present invention therefore provides a solution to the dynamic range problem discussed above that is unachievable through conventional systems.

It is preferred that the cancellation loop 30 includes a secondary A/D converter 36, a level adjustment circuit 38, and a D/A converter 40. The secondary AND converter 36 generates a digital cancellation signal based on the IF multi-carrier signal 26. The level adjustment circuit 38 is coupled to the secondary A/D converter 36 for digitally adjusting the digital cancellation signal such that carriers in the digital cancellation signal correspond to carriers in the IF multi-carrier signal 26 having power levels above a predetermined threshold 44. Thus, carriers 46 and 48 in the IF multi-carrier signal 26 would have corresponding carriers in the digital cancellation signal. In fact, it is the excess power of carriers 46 and 48 that causes the dynamic range problems associated with conventional approaches.

The D/A converter 40 generates an analog cancellation signal 42 based on the digital cancellation signal. It can be seen that carriers 50 and 52 of the analog cancellation signal 42 are 180° out of phase with carriers 46 and 48 of the IF multi-carrier signal 26, respectively. Carriers 50 and 52 have enough cancellation power to reduce the power of carriers 46 and 48 to a level at or below the predetermined threshold 44. This cancellation both equalizes the levels going into the primary A/D converter 34 and performs gain control for the main path.

LEVEL ADJUSTMENT CIRCUIT

It is preferred that the level adjustment circuit 38 includes a secondary channelizer 54 coupled to the secondary A/D converter 36 for generating a plurality of single carrier signals based on the digital cancellation signal. A level determine module 56 is coupled to the secondary channelizer 54 for determining power levels of the single carrier signals. The level adjustment circuit 38 further includes a timing module 58 coupled to the level determine module 56 for synchronizing the single carrier signals with the IF multi-carrier signal 26. It can further be seen that a level adjust module 60 is coupled to the timing module 58 for eliminating single carrier signals that correspond to carriers in the IF multi-carrier signal 26 having power levels below the predetermined threshold 44. The level adjust module 60 further adjusts power levels of single carrier signals that correspond to carriers in the IF multi-carrier signal 26 having power levels above the predetermined threshold 44. Thus, carriers 46 and 48 of the IF multi-carrier signal 26 can be reduced in power by the remaining single carrier signals. An adjustment summer 62 digitally sums single carrier signals that have not been eliminated by the level adjust module 60. The result is a digitally adjusted digital cancellation signal having carriers corresponding to carriers 46 and 48 in the IF multi-carrier signal 26.

It is important to note that the timing module 58 can adjust either time parameters or phase parameters of the single carrier signals to achieve synchronization. Furthermore, the level adjustment circuit 38 can optionally include a phase lock loop 64 (PLL) connected between the D/A converter 40 and the secondary channelizer 54 for providing timing feedback to the secondary channelizer 54.

It can also be seen that the feedforward cancellation loop 30 can further include a splitter 66 connected between the frequency conversion circuit 24 and the secondary A/D converter 36 for sampling the IF multi-carrier signal 26. Furthermore, a cancellation filter 68 is preferably coupled to the D/A converter 40 for filtering a predetermined cancellation bandwidth from the analog cancellation signal 42. In this manner, a cancellation summer 70 can be connected between the cancellation filter 68 and the frequency conversion circuit 24 for adding the analog cancellation signal 42 to the IF multi-carrier signal 26. The result is equalization of the signal levels input to the A/D converter 34, as indicated by the amplitude corrected multi-carrier signal 32. If the IF multi-carrier signal 26 is down converted to a relatively high center frequency (such as 200 MHz), the cancellation filter 68 will be a bandpass filter.

DELAY MODULE

It will be appreciated that the IF multi-carrier signal 26 in the main path of the receiver system 22 must be delayed based on the processing time of the cancellation loop 30. Thus, a delay module 96 is provided. One approach to the delay module 96 would be to insert one or more surface acoustic wave (SAW) delay lines into the main path. For frequencies between approximately 180 MHz and 195 MHz, a time delay of approximately 2 μs can be provided. Insertion losses for such a delay line would be less than 20 dB with flatness across the 180–195 MHz bandwidth being less than 0.5 dB. Furthermore, the time delay ripple across the 180–195 MHz bandwidth is less than 100 ns.

FREQUENCY CONVERSION CIRCUIT

It is important to note that the primary A/D converter 34 is designed to operate at a relatively high center frequency such as 200 MHz. This enables simplification of the frequency conversion circuit 24 (i.e., single down conversion). Thus, mixer 72 generates the IF multi-carrier signal 26 based on the transmission frequency multi-carrier signal 28 and an oscillation signal provided by oscillation source 74. The resulting IF multi-carrier signal 26 is at a frequency of approximately 200 MHz.

Figure 3:
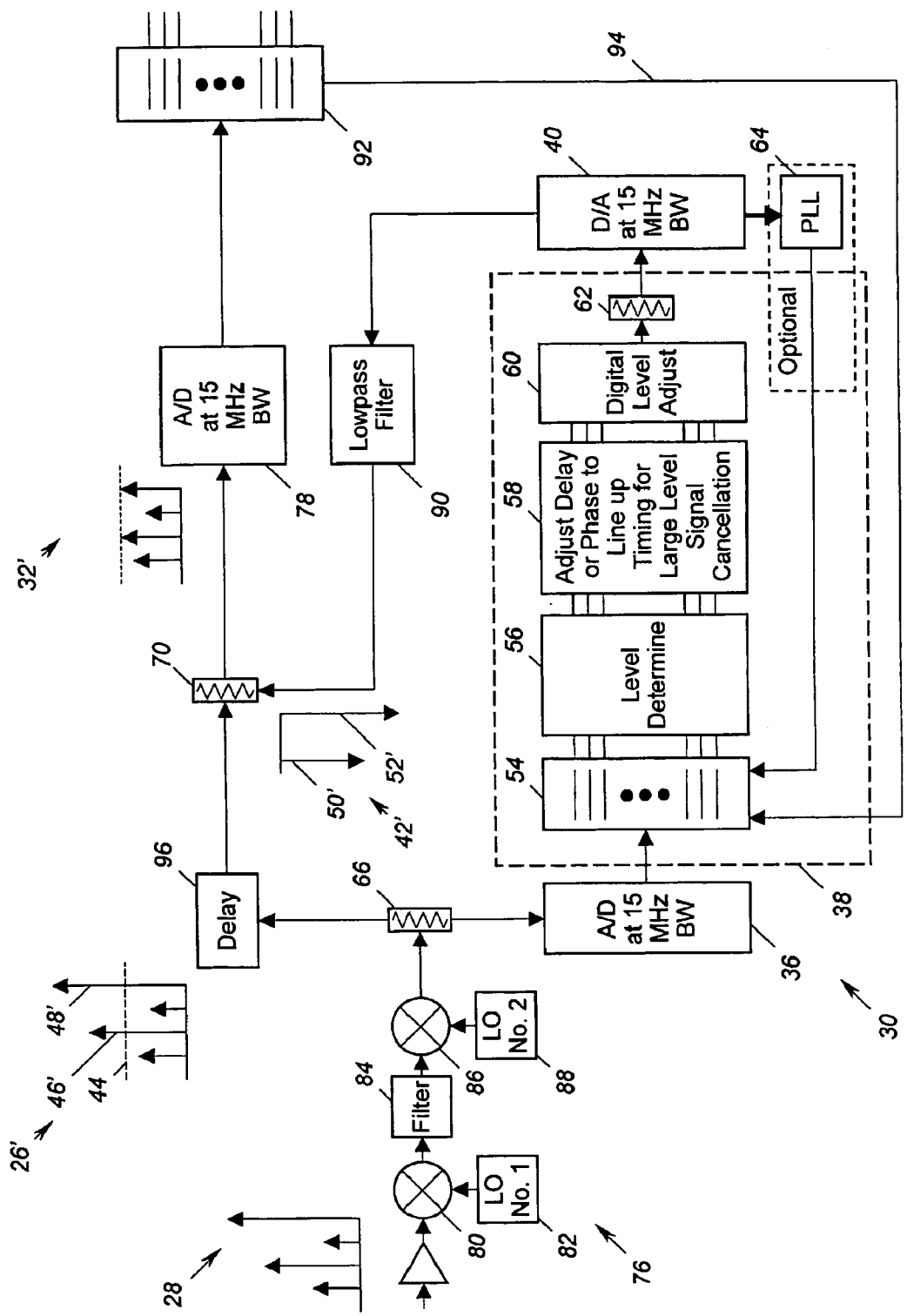
FIG. 3 shows a multi-carrier receiver system according to an alternative embodiment of the present invention.

Turning now to FIG. 3, it will be appreciated that an alternative frequency conversion circuit 76 can be provided in the event that the primary ND converter 78 is designed to operate at a lower frequency (such as 15 MHz). Here, the frequency conversion circuit 76 has a first mixer 80 for generating a preliminary IF multi-carrier signal based on the transmission frequency multi-carrier signal and a first oscillation signal provided by a first oscillation source 82. A transmission filter 84 filters a predetermined transmission bandwidth from the preliminary IF multi-carrier signal. At this point, the preliminary IF multi-carrier signal is at 200 MHz with a bandwidth of approximately 15 MHz. A second mixer 86 generates the IF multi-carrier signal based on the preliminary IF multi-carrier signal and a second oscillation signal from a second oscillation source 88. It should also be noted that in this example, the cancellation filter 90 is a low pass filter (LPF) due to the lower frequency range. The cancellation summer 70 effects equalization of the signal levels input to the A/D converter 78, as indicated by signal 32'.

With continuing reference to FIGS. 2–3, it can be seen that a primary channelizer 92 is coupled to the primary A/D converter for channelizing the digital bitstream generated by the A/D converter. The present invention further provides for a cancellation feedback loop 94 connected between the primary channelizer 92 and the level adjustment circuit 38 for providing cancellation feedback to the level adjustment circuit 38. Thus, the primary channelizer 92 is able to report cancellation performance back to the level adjustment circuit 38 in order to keep the receiver system calibrated. It is important to note that although the cancellation feedback loop 94 is shown as being connected between the primary channelizer 92 and the secondary channelizer 54, the cancellation feedback information may be reported to other components in the level adjustment circuit 38.

It will therefore be appreciated that the present invention provides a number of advantages over conventional systems and approaches. For example, the feedforward cancellation loop cancels blockers anywhere in the secondary channelizer bandwidth. Thus, the cancellation path bandwidth could be wider or narrower than the primary channelizer bandwidth, as desired. Furthermore, the present invention attenuates strong desired signals using a simple, programmable, frequency-selective automatic gain control algorithm. Using a Discrete Fourier Transform (DFT) based secondary channelizer allows the monitoring of all channels simultaneously—including blockers, desired signals, and unused channels—for possible cancellation.

Other advantages include the ability to perform self-calibration as part of a unit self-test. This will allow compensation for any unit-to-unit variations and slowly changing analog amplitude/phase/delay drift. It will also be appreciated that level adjustment circuit attenuation information is used to scale primary channelizer outputs in real-time in order to maintain constant end-to-end receiver gain. Another advantage is that digital filtering in the feedforward control loop can achieve any desired level of gain flatness, out-of-band rejection, etc., in order to meet system requirements. Additionally, by reducing dynamic range requirements on the primary A/D converter, the present invention provides for elimination of the second IF down conversion associated with conventional systems. The result is a significant reduction in parts and design complexity.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed:

1. A multi-carrier receiver system, comprising:
    a frequency conversion circuit for generating an intermediate frequency (IF) multi-carrier signal based on a transmission frequency multi-carrier signal;
    a feedforward cancellation loop for generating an amplitude corrected multi-carrier signal based on the IF multi-carrier signal such that the amplitude corrected multi-carrier signal has a reduced dynamic range with respect to the IF multi-carrier signal; and
    a primary analog to digital (A/D) converter for generating a digital multi-carrier signal based on the amplitude corrected multi-carrier signal;
    wherein the feedforward cancellation loop includes:
        a secondary A/D converter for generating a digital cancellation signal based on the IF multi-carrier signal; and
        a level adjustment circuit coupled to the secondary A/D converter for digitally adjusting the digital cancellation signal such that carriers in the digital cancellation signal correspond to carriers in the IF multi-carrier signal having power levels above a predetermined threshold.

2. The receiver system of claim 1 wherein the level adjustment circuit includes:
    a secondary channelizer coupled to the secondary A/D converter for generating a plurality of single carrier signals based on the digital cancellation signal;
    a level determine module coupled to the secondary channelizer for determining power levels of the single carrier signals; and
    a timing module coupled to the level determine module for synchronizing the single carrier signals with the IF multi-carrier signal.

3. The receiver system of claim 2 wherein the level adjustment circuit further includes:
    a level adjust module coupled to the timing module for eliminating single carrier signals that correspond to carriers in the IF multi-carrier signal having power levels below the predetermined threshold, the level adjust module further adjusting power levels of single carrier signals that correspond to carriers in the IF multi-carrier signal having power levels above the predetermined threshold; and
    an adjustment summer for digitally summing single carrier signals that have not been eliminated by the level adjust module.

4. The receiver system of claim 1 wherein the feedforward cancellation loop further includes:

a splitter connected between the frequency conversion circuit and the secondary A/D converter for sampling the IF multi-carrier signal; and a cancellation filter coupled to the D/A converter for filtering a predetermined cancellation bandwidth from the analog cancellation signal.

5. The receiver system of claim 4 wherein the feedforward cancellation loop further includes a cancellation summer connected between the cancellation filter and the frequency conversion circuit for adding the analog cancellation signal to the IF multi-carrier signal.

6. The receiver system of claim 1 further including:

a primary channelizer coupled to the primary A/D converter; and a cancellation feedback loop connected between the primary channelizer and the level adjustment circuit for providing cancellation feedback to the level adjustment circuit.

7. The receiver system of claim 6 further including a delay module for delaying the IF multi-carrier signal based on a processing time of the feedforward cancellation loop.

8. A multi-carrier receiver system, comprising:

a frequency conversion circuit for generating an intermediate frequency (IF) multi-carrier signal based on a transmission frequency multi-carrier signal;

a feedforward cancellation loop for generating an amplitude corrected multi-carrier signal based on the IF multi-carrier signal such that the amplitude corrected multi-carrier signal has a reduced dynamic range with respect to the IF multi-carrier signal; and a primary analog to digital (A/D) converter for generating a digital multi-carrier signal based on the amplitude corrected multi-carrier signal;

wherein the feedforward cancellation loop includes:

a secondary A/D converter for generating a digital cancellation signal based on the IF multi-carrier signal;

a level adjustment circuit coupled to the secondary A/D converter for digitally adjusting the digital cancellation signal such that carriers in the digital cancellation signal correspond to carriers in the IF multi-carrier signal having power levels above a predetermined threshold; and a digital to analog (D/A) converter for generating an analog cancellation signal based on the digital cancellation signal.

9. The receiver system of claim 8 wherein the level adjustment circuit includes:

a secondary channelizer coupled to the secondary A/D converter for generating a plurality of single carrier signals based on the digital cancellation signal;

a level determine module coupled to the secondary channelizer for determining power levels of the single carrier signals;

a timing module coupled to the level determine module for synchronizing the single carrier signals with the IF multi-carrier signal;

a level adjust module coupled to the timing module for eliminating single carrier signals that correspond to carriers in the IF multi-carrier signal having power levels below the predetermined threshold, the level adjust module further adjusting power levels of single carrier signals that correspond to carriers in the IF multi-carrier signal having power levels above the predetermined threshold; and an adjustment summer for digitally summing single carrier signals that have not been eliminated by the level adjust module.

10. The receiver system of claim 9 wherein the timing module adjusts time parameters of the single carrier signals.

11. The receiver system of claim 9 wherein the timing module adjusts phase parameters of the single carrier signals.

12. The receiver system of claim 9 wherein the level adjustment circuit further includes a phase lock loop connected between the D/A converter and the secondary channelizer for providing timing feedback to the secondary channelizer.

13. The receiver system of claim 8 wherein the feedforward cancellation loop further includes:

a splitter connected between the frequency conversion circuit and the secondary A/D converter for sampling the IF multi-carrier signal;

a cancellation filter coupled to the D/A converter for filtering a predetermined cancellation bandwidth from the analog cancellation signal; and a cancellation summer connected between the cancellation filter and the frequency conversion circuit for adding the analog cancellation signal to the IF multi-carrier signal.

14. The receiver system of claim 13 wherein the cancellation filter is a bandpass filter.

15. The receiver system of claim 13 wherein the filter is a lowpass filter.

16. A multi-carrier receiver system, comprising:

a frequency conversion circuit for generating an intermediate frequency (IF) multi-carrier signal based on a transmission frequency multi-carrier signal;

a feedforward cancellation loop for generating an amplitude corrected multi-carrier signal based on the IF multi-carrier signal such that the amplitude corrected multi-carrier signal has a reduced dynamic range with respect to the IF multi-carrier signal;

a primary analog to digital (A/D) converter for generating a digital multi-carrier signal based on the amplitude corrected multi-carrier signal;

a primary channelizer coupled to the primary A/D converter;

a cancellation feedback loop connected between the primary channelizer and the level adjustment circuit for providing cancellation feedback to the level adjustment circuit; and a delay module for delaying the IF multi-carrier signal based on a processing time of the feedforward cancellation loop.

17. A multi-carrier receiver system, comprising:

a frequency conversion circuit for generating an intermediate frequency (IF) multi-carrier signal based on a transmission frequency multi-carrier signal;

a feedforward cancellation loop for generating an amplitude corrected multi-carrier signal based on the IF multi-carrier signal such that the amplitude corrected multi-carrier signal has a reduced dynamic range with respect to the IF multi-carrier signal; and a primary analog to digital (A/D) converter for generating a digital multi-carrier signal based on the amplitude corrected multi-carrier signal;

wherein the frequency conversion circuit includes:

a first mixer for generating a preliminary IF multi-carrier signal based on the transmission frequency multi-carrier signal and a first oscillation signal;

a transmission filter for filtering a predetermined transmission bandwidth from the preliminary IF multi-carrier signal; and a second mixer for generating the IF multi-carrier signal based on the preliminary IF multi-carrier signal and a second oscillation signal.

18. A feedforward cancellation loop comprising:
a secondary A/D converter for generating a digital cancellation signal based on an intermediate frequency (IF) multi-carrier signal;
a level adjustment circuit coupled to the secondary A/D converter for digitally adjusting the digital cancellation signal such that carriers in the digital cancellation signal correspond to carriers in the IF multi-carrier signal having power levels above a predetermined threshold; and
a digital to analog (D/A) converter for generating an analog cancellation signal based on the digital cancellation signal.

19. The cancellation loop of claim 18 wherein the level adjustment circuit includes:
a secondary channelizer coupled to the secondary A/D converter for generating a plurality of single carrier signals based on the digital cancellation signal;
a level determine module coupled to the secondary channelizer for determining power levels of the single carrier signals;
a timing module coupled to the level determine module for synchronizing the single carrier signals with the IF multi-carrier signal;
a level adjust module coupled to the timing module for eliminating single carrier signals that correspond to carriers in the IF multi-carrier signal having power levels below the predetermined threshold, the level adjustment module further adjusting power levels of single carrier signals that correspond to carriers in the IF multi-carrier signal having power levels above the predetermined threshold; and
an adjustment summer for digitally summing single carrier signals that have not been eliminated by the level adjust module.

20. The cancellation loop of claim 19 wherein the timing module adjusts time parameters of the single carrier signals.

21. The cancellation loop of claim 19 wherein the timing module adjusts phase parameters of the single carrier signals.

22. The cancellation loop of claim 19 wherein the level adjustment circuit further includes a phase lock loop connected between the D/A converter and the secondary channelizer for providing timing feedback to the secondary channelizer.

23. The cancellation loop of claim 18 further including:
a splitter connected between a frequency conversion circuit and the secondary A/D converter for sampling the IF multi-carrier signal;

a cancellation filter couple to the D/A converter for filtering a predetermined cancellation bandwidth from the analog cancellation signal; and
a cancellation summer connected between the cancellation filter and the frequency conversion circuit for adding the analog cancellation signal to the IF multi-carrier signal.

24. A method for receiving a transmission frequency multi-carrier signal, the method comprising the steps of:
generating an intermediate frequency (IF) multi-carrier signal based on the transmission frequency multi-carrier signal;
generating an amplitude corrected multi-carrier signal based on the IF multi-carrier signal such that the amplitude corrected multi-carrier signal has a reduced dynamic range with respect to the IF multi-carrier signal;
generating a digital multi-carrier signal based on the amplitude corrected multi-carrier signal;
generating a digital cancellation signal based on the IF multi-carrier signal; and
digitally adjusting the digital cancellation signal such that carriers in the digital cancellation signal correspond to carriers in the IF multi-carrier signal having power levels above a predetermined threshold.

25. A method for receiving a transmission frequency multi-carrier signal, the method comprising the steps of:
generating an intermediate frequency (IF) multi-carrier signal based on the transmission frequency multi-carrier signal;
generating an amplitude corrected multi-carrier signal based on the IF multi-carrier signal such that the amplitude corrected multi-carrier signal has a reduced dynamic range with respect to the IF multi-carrier signal;
generating a digital multi-carrier signal based on the amplitude corrected multi-carrier signal;
generating a digital cancellation signal based on the IF multi-carrier signal;
digitally adjusting the digital cancellation signal such that carriers in the digital cancellation signal correspond to carriers in the IF multi-carrier signal having power levels above a predetermined threshold; and
generating an analog cancellation signal based on the digital cancellation signal.

* * * * *